(12) United States Patent
Jose

(10) Patent No.: US 11,561,890 B2
(45) Date of Patent: Jan. 24, 2023

(54) AUTOMATED VIDEOGAME TESTING

(71) Applicant: WARNER BROS. ENTERTAINMENT INC., Burbank, CA (US)

(72) Inventor: Eldo Jose, Schaumburg, IL (US)

(73) Assignee: Warner Bros. Entertainment Inc., Burbank, CA (US)

(*) Notice: Subject to any disclaimer, the term of this patent is extended or adjusted under 35 U.S.C. 154(b) by 0 days.

(21) Appl. No.: 17/169,470

(22) Filed: Feb. 7, 2021

(65) Prior Publication Data

US 2021/0279167 A1    Sep. 9, 2021

Related U.S. Application Data

(60) Provisional application No. 62/971,856, filed on Feb. 7, 2020.

(51) Int. Cl.
  *G06F 11/36* (2006.01)
  *G06F 8/51* (2018.01)
  *H04L 67/141* (2022.01)
  *G06F 9/445* (2018.01)

(52) U.S. Cl.
  CPC ........... *G06F 11/3688* (2013.01); *G06F 8/51* (2013.01); *G06F 9/445* (2013.01); *G06F 11/3664* (2013.01); *H04L 67/141* (2013.01)

(58) Field of Classification Search
  CPC ............ G06F 11/3688; G06F 11/3684; G06F 11/3664; G06F 11/3672
  See application file for complete search history.

(56) References Cited

U.S. PATENT DOCUMENTS

| | | | |
|---|---|---|---|
| 9,189,378 B1* | 11/2015 | Ryan | .................... G06F 11/3668 |
| 10,983,903 B1* | 4/2021 | Yawalkar | ................ H04L 43/50 |
| 2009/0307763 A1* | 12/2009 | Rawlins | ............... G06F 11/2294 |
| | | | 714/E11.002 |
| 2021/0064516 A1* | 3/2021 | Gomez | ............... G06F 11/3419 |

* cited by examiner

*Primary Examiner* — Duy Khuong T Nguyen
(74) *Attorney, Agent, or Firm* — One LLP; Jonathan Jaech

(57) ABSTRACT

An automated testing framework and associated tools for executable applications such as games focus on integration testing, wherein users create data-driven tests by using test modules and configuration data as building blocks. The tools facilitate cooperation between coders and non-technical Quality Assurance (QA) staff in creating automated tests, by simplifying the user interface for configuring tests. Components of the tools simulate user interactions with the application under test, for example, gamepad button presses. The tools are also capable skipping portions of gameplay or other interactive activity and directly jumping into a desired game mode during automated testing, and other functions.

17 Claims, 12 Drawing Sheets

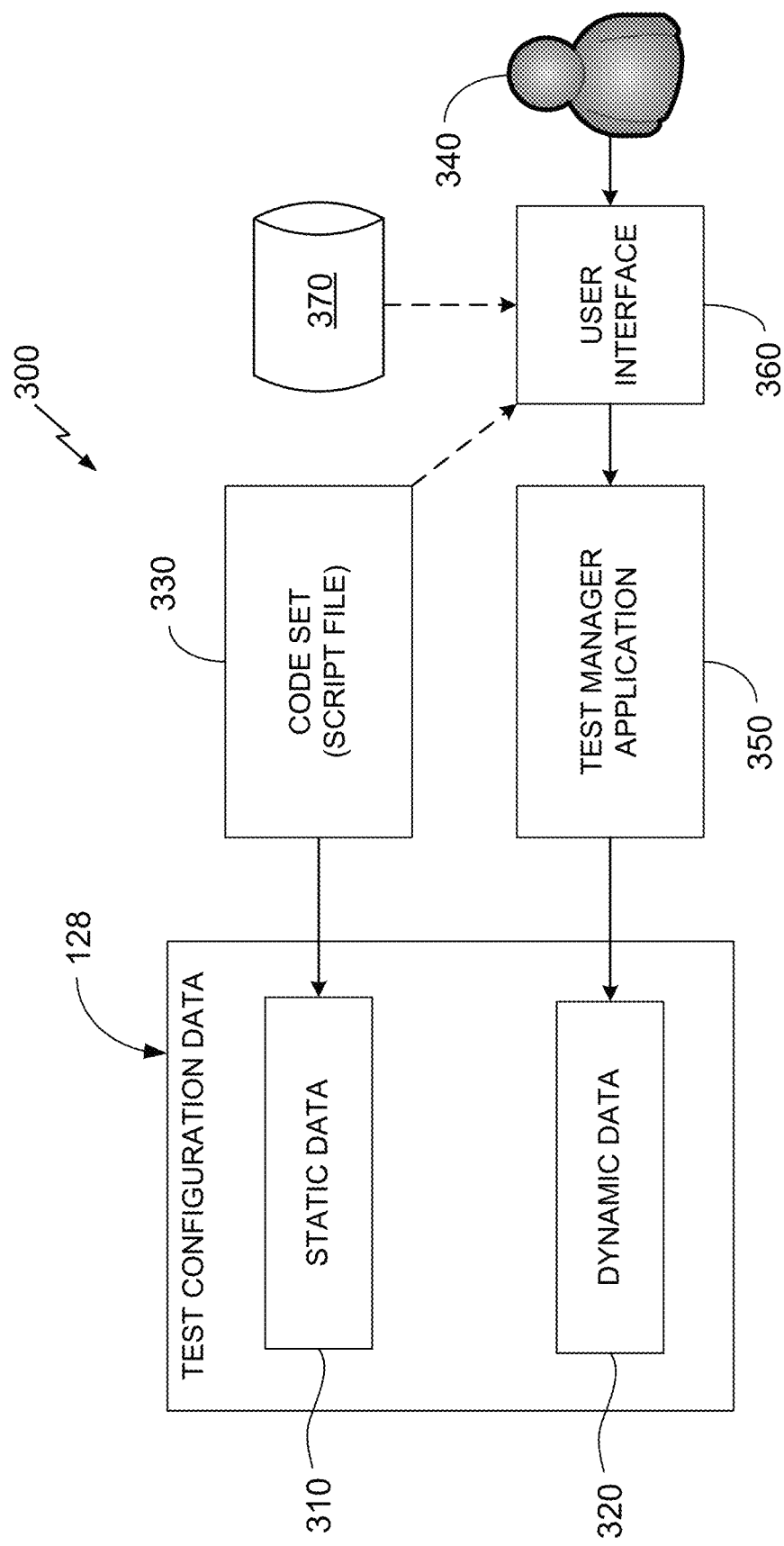

1110

INSTRUCTING A SERVER INTERPOSED BETWEEN THE AT LEAST ONE TEST DEVICE AND THE AT LEAST ONE PROCESSOR TO LAUNCH AN AGENT APPLICATION ON THE AT LEAST ONE TEST DEVICE

1120

ESTABLISHING A CONNECTION BETWEEN THE AT LEAST ONE PROCESSOR AND THE AGENT APPLICATION OPERATING ON THE AT LEAST ONE TEST DEVICE FOR OUTPUTTING THE SEQUENCE OF COMMANDS

1210

PRESENTING A LIST OF THE MULTIPLE SCRIPT FILES IN A USER INTERFACE AND RECEIVING A USER SELECTION FROM THE LIST INDICATING THE SCRIPT FILE

1220

PRESENTING A LIST OF TEST DEVICES SATISFYING ONE OR MORE CRITERIA IN A USER INTERFACE AND RECEIVING A USER SELECTION FROM THE LIST INDICATING THE AT LEAST ONE TEST DEVICE

┌─ 1310
RECEIVING AN INDICATION FROM THE AT LEAST ONE TEST DEVICE INDICATING A STATUS OF THE EXECUTABLE APPLICATION AFTER EXECUTING THE SEQUENCE OF COMMANDS, AND OUTPUTTING THE INDICATION

┌─ 1320
COMMUNICATING WITH A COMMUNICATION LAYER OF A TEST MODULE OF THE EXECUTABLE APPLICATION, WHEREIN THE COMMUNICATION LAYER HANDLES COMMUNICATION AND A GAME LAYER OF THE TEST MODULE PROCESSES THE SEQUENCE OF COMMANDS

┌─ 1330
INITIATING THE COMMUNICATION BY SENDING A TCP CONNECTION REQUEST TO THE COMMUNICATION LAYER

┌─ 1340
GENERATING THE SEQUENCE OF COMMANDS AT LEAST IN PART BY TRANSCODING THE USER INPUT SEQUENCE FROM A SCRIPTING LANGUAGE TO A COMMAND LANGUAGE

AUTOMATED VIDEOGAME TESTING

CROSS-REFERENCE TO RELATED APPLICATION

The present application claims priority pursuant to 35 U.S.C. § 119(e) to U.S. Provisional Patent Application Ser. No. 62/971,856 filed Feb. 7, 2020, which application is incorporated herein by reference in its entirety.

FIELD

The present application relates to technical methods, apparatus and systems for automated and semi-automated testing of videogames and similar applications.

BACKGROUND

Videogames and other complex applications require rigorous testing before public release. Various methods and tools exist to automate the most tedious and time-consuming parts of the testing process.

For example, the Software Testing Automation Framework (STAF) provides components for building an automation infrastructure, but the components do not necessarily enable optimization of the test process. For example, a STAF implementation does not provide a flexible framework for adapting test requirements and imposes limits on specifying test configuration tools. The tool also fails to run consistently during matrix tests, due to an inability to detect test failures and continue execution. Moreover, implementation demands installing third-party software, and coping with a user interface that is difficult for non-technical people to navigate. However, most Quality Assurance (QA) staff are not technical coders. Tests are therefore time-consuming to set up and consume an undesirable amount of technical resources.

It would be desirable, therefore, to develop new methods and other new technologies for automatic or semi-automatic testing of videogame and similar applications, that overcomes these and other limitations of the prior art.

SUMMARY

This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions using different terminology, as should be apparent from the respective disclosures.

In an aspect of the disclosure, a computer-implemented method for automatically testing reaction of an executable application to user inputs may include selecting, by at least one processor in response to first user input, a script file encoding a user input sequence from multiple script files in a computer memory. Each of the script files may be prepared in advance by technical staff and may include information for controlling a specified test operation by an application-under-test, e.g., a videogame. As used herein, a "script file" means an information set encoded in a non-transitory computer memory according to a computer scripting language, for example, JavaScript Object Notation-Remote Procedural Call (JSON-RPC) or Python. The selecting may include, for example, presenting a list of the multiple script files in a user interface and receiving a user selection from the list indicating the script file. In an alternative, or in addition, the selecting may include presenting a list of test devices satisfying one or more criteria in a user interface and receiving a user selection from the list indicating the at least one test device.

The method may further include identifying, by the at least one processor, at least one test device configured for executing the executable application and communicating with the at least one processor. The test device may include any computing device capable of executing the application-under-test.

The method may further include generating, by the at least one processor based on the script file, a sequence of commands for processing by the executable application. For example, the at least one processor may execute an algorithm that automatically generates commands for a test module of the application-under-test, based on contents of the script file. The generating may include, for example, transcoding the user input sequence from a scripting language to a command language.

The method may further include outputting the sequence of commands for delivery to the at least one test device executing the executable application-under-test. The outputting may include, for example, opening a TCP session with the test device.

The method may further include receiving an indication from the at least one test device indicating a status of the executable application after executing the sequence of commands and outputting the indication. The indication may be configured for use by QA personnel to identify issues with the application-under-test on the test device.

In some embodiments, the method may include instructing a server interposed between the at least one test device and the at least one processor to launch an agent application on the at least one test device, and establishing a connection between the at least one processor and the agent application operating on the at least one test device for outputting the sequence of commands. For example, using the interposed server may be useful when the at least one processor lacks access to an application program interface (API) or similar tool for providing executable commands to the test device.

The method may further include, by the at least one processor, performing multiple instances of the method in parallel, wherein each instance is for a different test device. Accordingly, the at least one processor can test the suitability of many different test devices at once and identify any issues that the application-under-test may have with operating on different hardware models and operating system versions.

In an aspect of the method, the executable application (application-under-test) may include a test module comprising a communication layer that handles communication with the at least one processor, and a game layer that processes the sequence of commands. The test module may be deactivated in published versions of the executable application or omitted entirely. The communication layer may, for example, listen for incoming TCP connection requests generated by the at least one processor.

As used herein, a "client device," "test device," or "server" each include at least a computer processor coupled to a memory and to one or more ports, including at least one input port and at least one output port (e.g., a desktop computer, laptop computer, tablet computer, smartphone, PDA, etc.). A computer processor may include, for example, a microprocessor, microcontroller, system on a chip, or other processing circuit. As used herein, a "processor" means a computer processor.

In other aspects of the disclosure, an apparatus for performing a method as described herein may include at least one processor operatively coupled to a computer memory, the memory holding program instructions, that when executed by the at least one processor, cause the apparatus to perform the method. A system for performing the method may include an apparatus as just described operatively coupled to a test device, for example, using an Internet connection.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the examples may be employed. Other advantages and novel features will become apparent from the following detailed description when considered in conjunction with the drawings and the disclosed examples, which encompass all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify like elements correspondingly throughout the specification and drawings.

FIG. 3 is a composite diagram illustrating a comparison of an end user screenshot view to a corresponding test template script.

FIGS. 11-13 are flow charts illustrating optional or alternative aspects of the method illustrated by FIG. 10.

DETAILED DESCRIPTION

Figure 1:
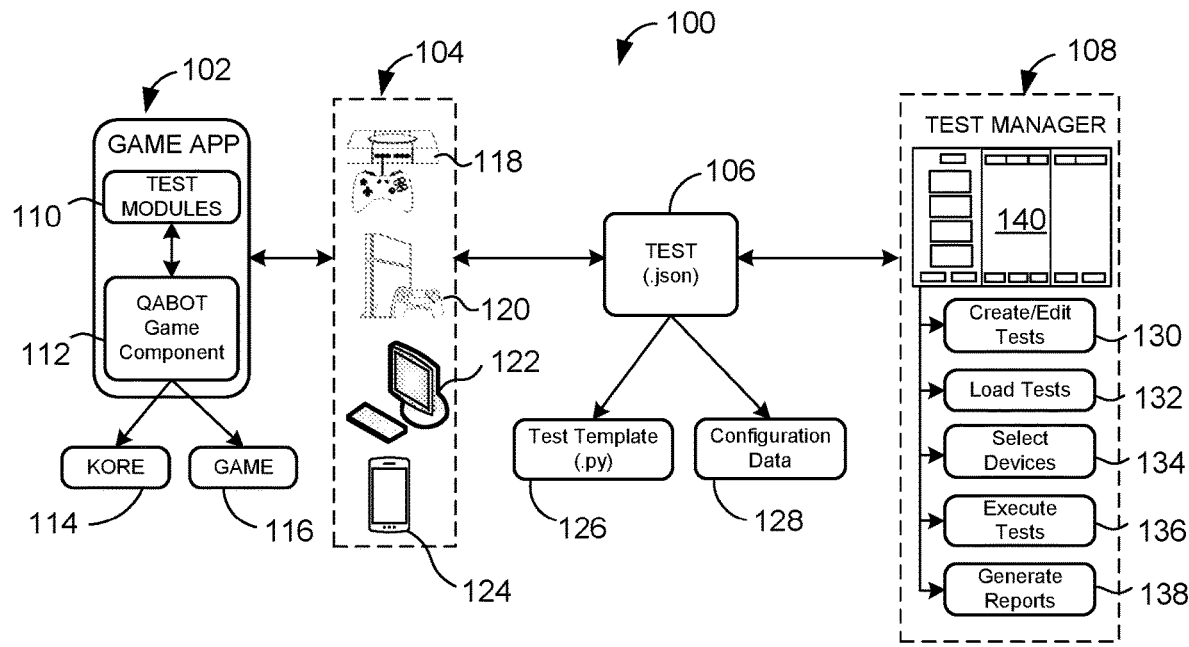
FIG. 1 is a schematic diagram illustrating functional components of a system for automated application testing, in relation to a collection of test devices.

Various aspects are now described with reference to the drawings. In the following description, for purposes of explanation, numerous specific details are set forth to provide a thorough understanding of one or more aspects. It may be evident, however, that the various aspects may be practiced without these specific details. In other instances, well-known structures and devices are represented in block diagram form to facilitate focus on novel aspects of the present disclosure.

An automation testing framework as disclosed herein, sometimes referred to as "QABot," may enable integration testing wherein less technical users (e.g., QA personnel) create data-driven tests by using test modules and configuration data as building blocks. This framework allows technical and non-technical people to work together in creating automated tests. Non-technical users may use the framework via a QABot test manager application. For example, QABot simulates gamepad button activation/presses like a player, using an automated test manager. It is also capable of running tests by directly jumping into game modes and skipping certain parts of the game. QABot is useful for performing a variety of tests, for example, matrix tests, performance tests, feature tests and navigation tests of videogame applications, managed and run by non-technical operators.

The automated testing framework disclosed herein offers many concrete advantages. For example, the framework provides a common interface and workflow for testing applications developed on different game engines, for example different versions of Unreal Engine™ or Unity™. The framework enables testing of application builds on specific non-transitory media, for example, disc builds, memory stick builds, or digital download packages. It enables automated running of matrix tests, for evaluating accuracy and implementation of the application-under-test against performance requirements for gameplay. It enables automated testing of performance and memory use for evaluating application core functionality, character and function response for game designers, and graphical output for art designers. In addition, the framework is easily accessible without requiring installing of special software tools or libraries, beyond the test manager itself and libraries conventionally present in personal computers.

In other aspects, the test manager tool is designed for rapid learning, with an intuitive GUI, requiring minimal learning to pick up the tool and run tests. The tool enables user to run tests locally and choose the build configuration and platform for executing a test. Support for continuous integration testing (e.g., using TeamCity™ API) to validate QA builds is also provided.

In an aspect, the systems, apparatus and methods described herein enable parallel execution for multiple tests at the same time if there are enough devices available to run the tests, regardless of the platform selection. Hence, simultaneous testing of different test device hardware and operating systems is possible. To provide a test creation process that is simple for non-technical users while also being flexible, the systems, apparatus and methods modular test logic encodes as interoperable scripts that can be combined and configured by non-technical users. Logic for executing a test may be encoded by a test template, while a test file may contain the configuration data used to run the test. This separation may facilitate parallel execution of matrix tests. For example, for running fatality matrix tests on all the characters against all other characters, tests for each individual character may share the same test template script.

Referring to FIG. 1, a system 100 for automated testing may include a game application 102 under test, one or more test devices 104, a test file 106 that includes a reference to a test template file 126 and configuration data 128, and a test manager application 108 (part of a QAbot system) that handles the user interface for QA users. The test manager 108 may be implemented as a standalone application that provides interfaces to create, edit, load and execute tests. It may also manage hardware devices and sync up configuration data from the game application 102.

The application 102 may include in-game test modules 110. Each test module 110 may be coded to perform specific actions, such as for example navigating a menu, moving a character, determining a character fatality, and many other actions. The test modules 110 have access to game states in order to perform various actions and may be disabled or omitted in public distributions.

Each test module 110 may be configured with basic interfaces, for example, an interface for initializing the module, updating the module, determining when a test is completed, and rendering debugging data for a completed test. Each module 110 may be configured as an in-game module for performing specific actions such as, for example, navigating a menu or moving a character.

Behavior of the modules 110 may be contextual. For example, a "ModeQuitter" test module's job may take the game to the "Main Menu" from any game state. If ModeQuitter is invoked in middle of a "versus fight" (i.e., a fight between two characters, at least one of which is a player's avatar), then it may internally invoke a separate "VersusFightQuitter" test module which activates the pause menu to quit the match and take the game back to the "Main Menu". But if the game is in "Player Select" mode, then it invokes "PlayerSelectQuitter" test module which simulates pressing of the appropriate buttons or taking appropriate actions to exit the mode.

The QABot game component 112 within the game application 102 receives the test commands and creates appropriate test modules 110 to execute commands. The game component 112 may be configured with two layers, a "kore" (core) layer 114 and a game layer 116. The kore layer 114 maintains communication between the game 102 and the test manager 108 generating commands from the test script 106. The kore layer 114 receives and queues test commands from the test manager 108 and passes those commands to game layer 116 one at a time. The game layer 116 processes the test commands and invokes appropriate test modules to execute the test specified by the test script. The game layer 116 communicates test results back to the test manager 108 or other data management application via the kore layer 114.

In an aspect, test modules 110 may be compiled in automatically for debug and development builds, so that engineers can run QABot tests on their local builds (e.g., builds in local memory). For profile builds (e.g., builds for a environment specified by a profile) and retail builds (e.g., builds for retail release), an extra build flag may be required to enable test modules 110 needed for operation of the test manager 108. As an extra precautionary step to avoid unintended use of QABot, a launch parameter may also be used to determine whether to "activate" the game component 116 for accepting incoming connection requests from test scripts.

The test manager 108 interacts with a test file 106, for example, a JSON-RPC file containing configuration data and reference to a test template script file. Using the test manager GUI 140, an end user (e.g., QA user) selects a test template 126 for each desired test and specifies configuration data for the test template. The test manager generates the test file 106 including references to the selected test template 126 and configuration data 128.

Each test template 126 may be coded in an appropriate scripting language, for example, Python™. The test template script 126 defines calls to a sequence of one or more test modules with configuration data 128 for a test 106. Selecting and configuring a test template script 126 is an initial step towards creating an automated test 106. A test template script 126 may utilize other scripted modules to communicate with the game application 102 as well as with the test manager 108. A test template script may include 2 parts, test data definition and test logic, described in more detail in connection with FIGS. 3 and 4 below.

The test manager 108 provides a GUI 140, 500, described in more detail in connection with FIGS. 4-6 below. The manager 108 enables a QA user to perform high-level functions, for example, creating and editing tests 130, loading tests onto specified test devices 132, selecting or de-selecting test devices for specified tests 134, triggering execution of a specified test by a specified test device 136, and generating QA reports showing test results 138.

The test devices 104 may include any device capable for executing the application 102. For current videogame applications, test devices 104 may include a first game console 118 (e.g., an Xbox™), a second game console (e.g., a Play Station™), a personal computer 122, or a mobile device 124, e.g., an smartphone or notepad computer running iOS or Android operating system.

Test modules 110 are technical components created by programmers. Arranging calls to different test modules is simple enough that non-technical users can build a variety of useful automations. For example, suppose a programmer makes a test module that will load a fight and have player 1 kill player 2, naming it the 'Finish Them' module. A QA user adds a call to the 'Finish Them' module to the test logic component of the template file 126. When she creates a test 106, the test manager 108 displays a menu with options to select characters, background and "Finish Them" actions for setting configuration data 128.

Figure 2:
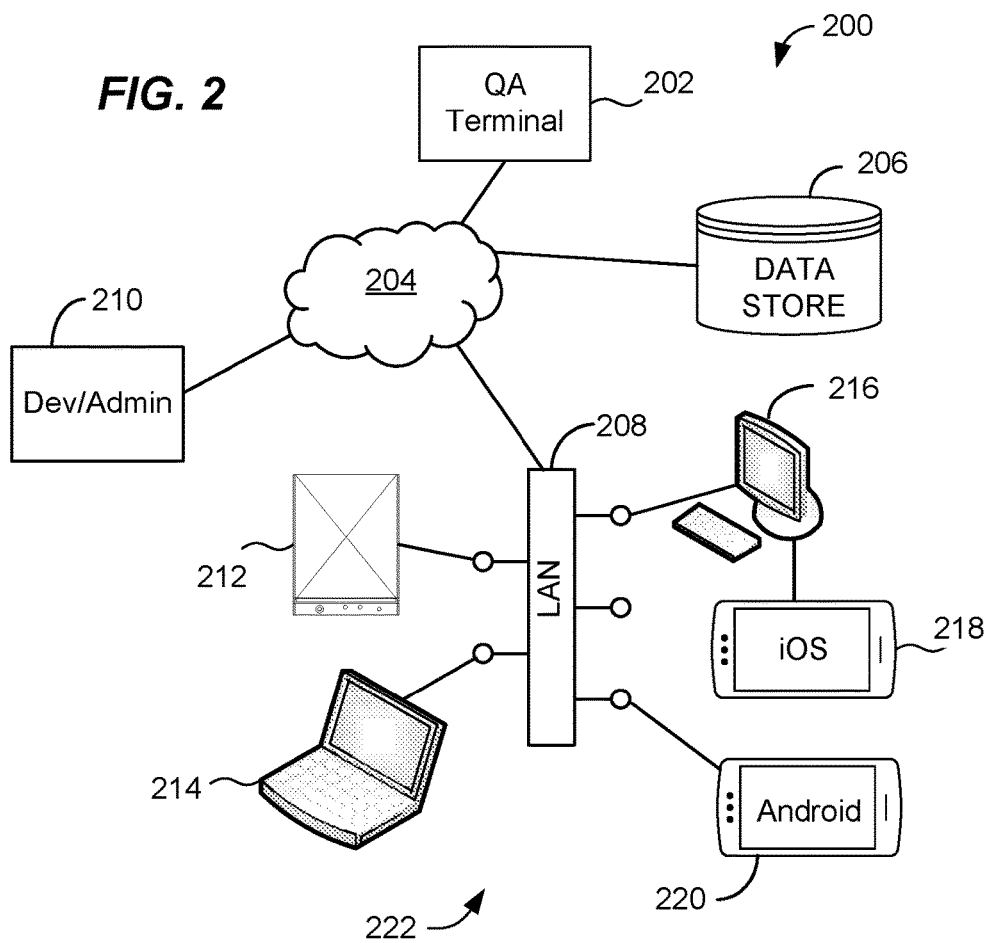
FIG. 2 is a schematic diagram illustrating hardware components of a system for automated application testing, with ancillary components.

FIG. 2 shows hardware components of a system 200 for automated application testing, with ancillary components. A QA terminal 202 for the end user configuring a test may be, or may include, a personal computer operating any suitable operating system. The system 200 may include one or more additional terminals 210 for development or administration of software. The additional terminals may be, or may include, a personal computer. Terminals 202, 210 may be operatively coupled to one another through any suitable network 204, for example, a Wide Area Network (WAN) or Local Area Network (LAN). The system 200 may include one or more non-transitory computer memories 206 for storing executable programs, applications-under-test (e.g., a game application 102 to be tested, including test modules 110 and QAbot game components 112), script files, data, and other software components as described herein. The one or more computer memories may be, or may include, a data server, cloud server, or local memory device, which may be coupled to the QA terminal 202, development and admin terminal 210, and test device network 208 via any suitable local or remote connection.

The system 200 may further include a test facility including various test devices 222 coupled to the network 204, optionally via a second network 208, for example a LAN. In an alternative, or in addition, the test devices 222 may be coupled directly to the QA terminal 202, for example, via a serial connection such as a Universal Serial Bus (USB). The test devices 222 each execute the applications-under-test, such as, for example, a game application 102, including test modules 110 and QAbot game components 112. An end user can configure tests 106 using the test manager 108 executing on the QA terminal 202, at least in part by selecting and adding calls to test modules 110 to a test file 106 and defining configuration data 128 for each test. The test manager 108 may perform other test functions 130-138 as outlined in FIG. 1 and described elsewhere herein. Developers and administrators may use independent nodes, for example the terminal 210, to encode test modules 110, QABot game components 112, modular test templates 126, and the test manager application 108 for end users.

The test devices may include, for example, a game console 212, a personal computer 214 in any suitable form factor, for example, a desktop computer 216, laptop computer 214, or wearable device such as, for example, virtual reality (VR) or augmented reality (AR) goggles (not shown); and/or a smartphone 218, 220, for example a smartphone equipped with an iOS operating system 218, or a smartphone equipped with an Android operating system. Each type of the devices 222 may be instantiated by a great variety of models and operating system versions. Accordingly, assuring stability and functionality of the application-under-test on a wide variety of different test devices is one of the purposes and challenges facing quality assurance for user-facing applications, such as video games or the like. Additionally, popular operating systems (e.g., iOS) may for security reasons block transaction requests needed to complete application testing, while other systems allow such requests. Overcoming such security restrictions efficiently and appropriately is another challenge facing designers of automated testing methods and apparatus.

FIG. 3 shows a system 300 including test configuration data 128 having static test data 310 and dynamic test data 320. Test data is, or may include, a collection of configuration data 128 fields driving a test. Test data may be specified as static 310 or dynamic 320 depending on how it is defined. Static test data 310 may be defined in a script file or other code set 330 (e.g., test file 106) by a programmer in advance of test configuration by a QA end user 340. Dynamic test data 320 may be obtained from a test manager application 350 (e.g., the test manager 108) and defined by the QA end user 340 when configuring a test. For example, a user interface of the test manager application 360 may present options to the user 340 from the code set 330, a database 370, or other source. Options for selection by a QA end user may be exposed through UI elements (e.g., drop down lists, combo boxes etc.). The user interface 360 may display a list of available character selection options from a script file to the QA end user, during a test creation process managed by the test manager application 350 via the test manager GUI 360.

Figure 4A:
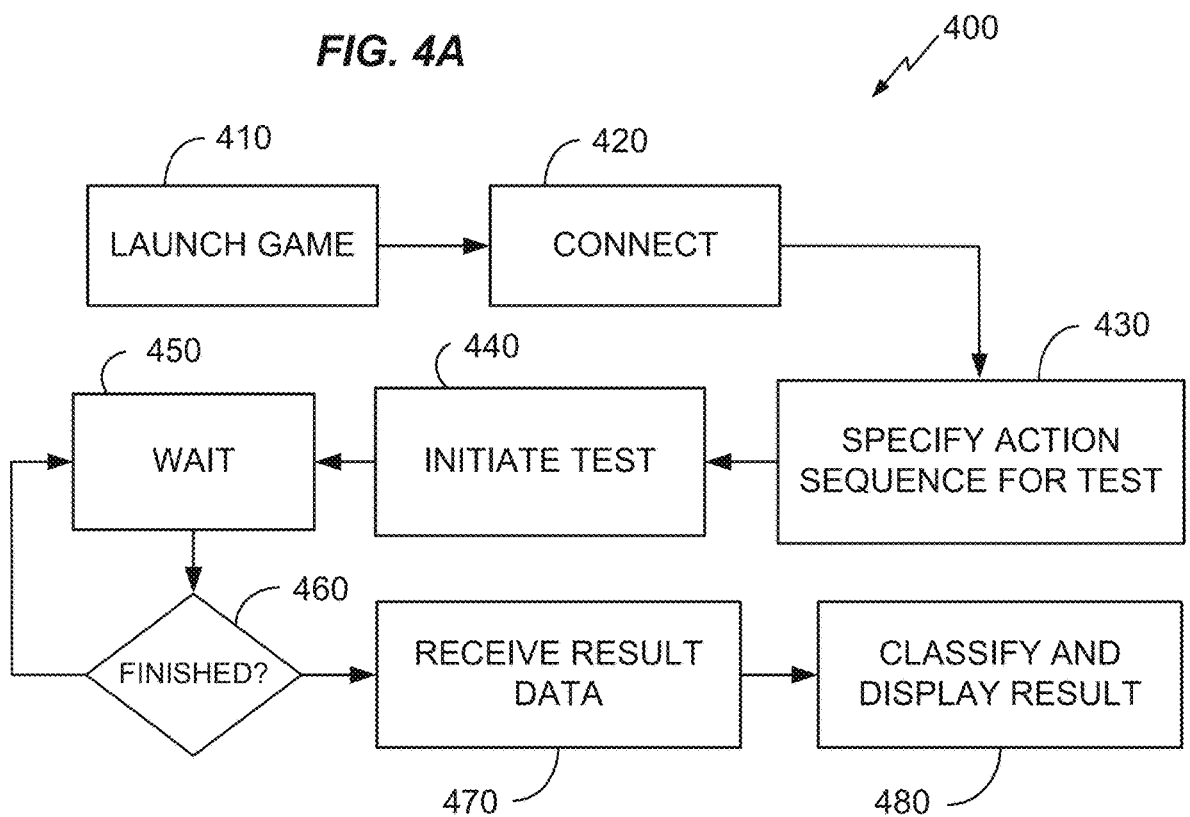
FIG. 4A is a flow diagram illustrating high-level operations of a method for automated application testing.

Referring to FIG. 4A, test logic for a test method 400 may be defined by a QA end user using the test manager to string together (sequence) test modules with associated configuration data into a test command for communicating to the game under test 102. Test commands, queries and game responses may be constructed using JSON-RPC command language; other languages may also be suitable. FIG. 4A shows an example of a "test logic" used for main program flow 400. The test logic may be defined by the test file, with various operations executed by the test manager and application under test.

Execution begins when a user selects a test from a selection screen of the test manager 108. The test manager tells the test template to run, passing it configuration data. At 410, test logic defined by the test template launches the game application on available ones of selected test device hardware targets. The test logic generates commands (e.g., using JSON-RPC) for the game application under test on each test device. At 420, the test manager initiates a connection session (e.g., using a TCP/IP protocol) for communication with both the game application under test and the test manager. At 430, the test manager specifies an action sequence for the game under test. At 440, test modules within the game under test receive and execute commands using the supplied test data, implementing the action sequence specified by the test data. At 450, the test manager waits for the specified action sequence to finish execution on the test device. At 460, the test modules determine that the action sequence is completed and send test data to the test manager. At 470, the test manager receives test result data from the game component. At 480, the test manager classifies (e.g., success, failure) the test data and displays selected test data and classification results to the end user, and/or generates a test report and saves it in a computer memory for later review.

Figure 4B:
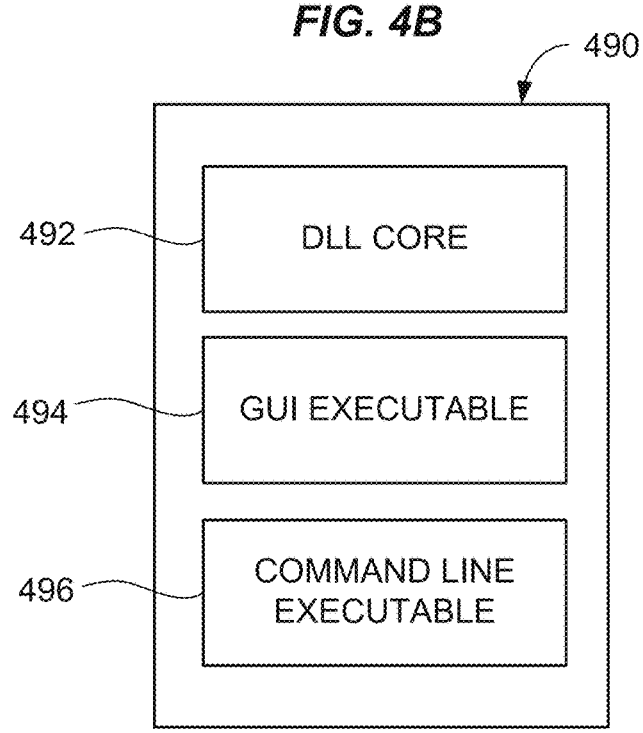
FIG. 4B is a block diagram illustrating an example of test manager components.

FIG. 4B shows an example of test manager components. A test manager 490 may include three component parts. The test manager 490 may include a core module 492 built as a Dynamic Link Library (DLL). The DLL architecture enables the core module to be plugged into existing development tools that are Microsoft™ Windows™ form based. The test manager 490 may also include a user-facing GUI executable 494, which may be implemented as a Windows™ form executable which loads the core DLL and manages user interaction with the DLL core 492. In addition, the test manager 490 may include a command line executable 496, which loads the core DLL and enables silent test executions. For example, the command line executable 496 may enable continuous integration testing of QA Builds, via TeamCity™ or similar platforms. Using a DLL architecture may facilitate integration of the QABot Test Manager 490 to other development tools used by engineers and increase accessibility of the test manager.

Figure 5:
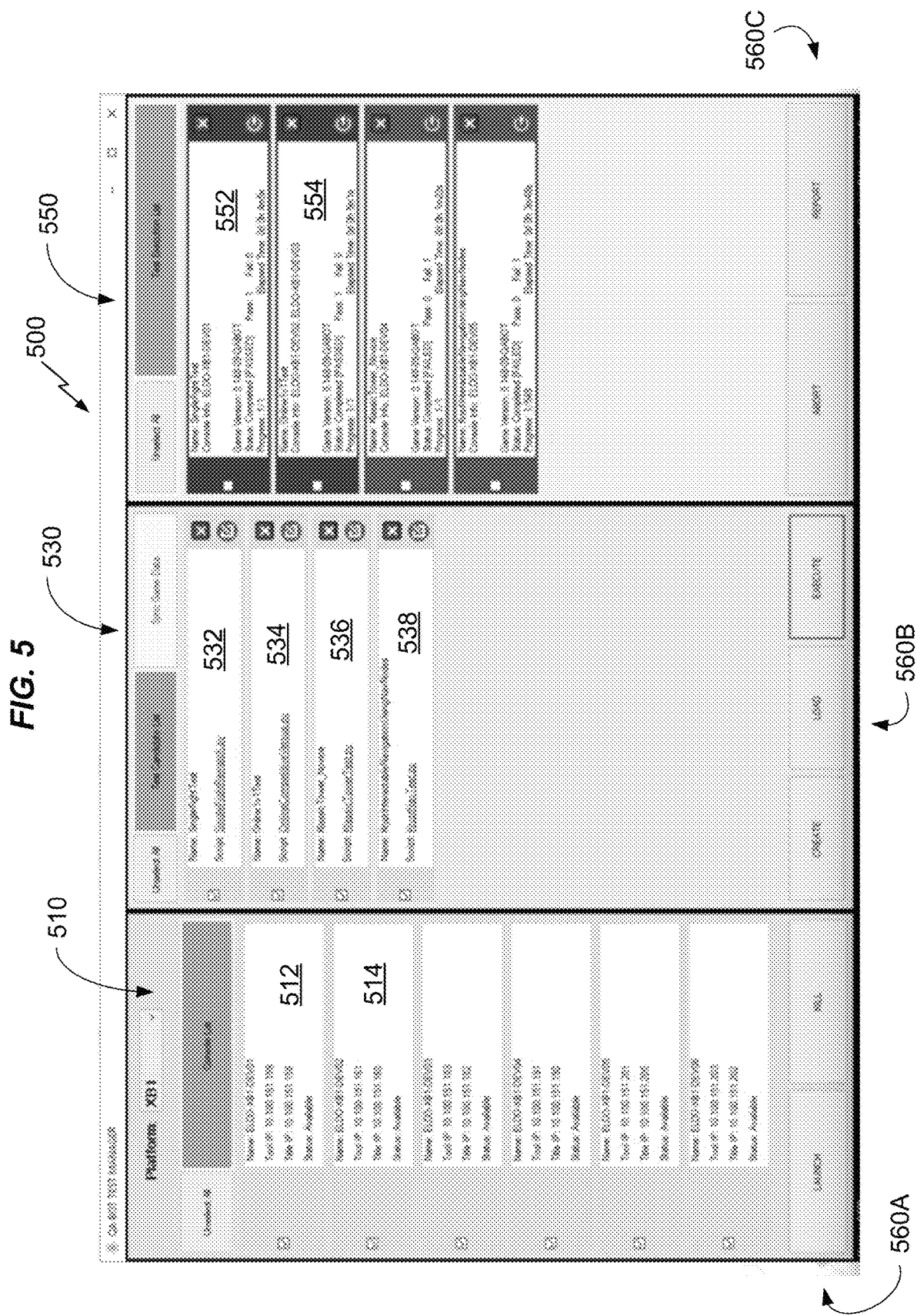
FIG. 5 is a screenshot illustrating aspects of a Graphical User Interface (GUI) of a test manager application for performing operations of a method as described herein.

Referring to FIG. 5, a main user interface 500 of the test manager for defining a test is shown, as an example of GUI features and functions of the test manager. The test manager enables a user to select a platform and devices required to run a test. The device information (e.g., name and IP addresses) may be specified in a JSON file. The test manager manages the device allocation for each test. The leftmost panel 510 indicates the current test platform (for example, Xbox™ Playstation™ Android™, iOS™ or Windows™ PC) and shows a list of configured test devices. For example, at item 512, the UI 500 shows an identifier and IP addresses for a test device, and a status here shown as 'available'. Item 514 shows similar information for a second test device. The test manager may verify the status of the test device by communicating with it (or attempting to communicate) and automatically assessing of results of the communication. Function buttons 560A at the bottom of the panel 510 enable a user to launch or kill (terminate) the game application on the selected test devices.

After setting up the test devices, the end user loads the tests for execution. The middle panel 530 shows a test candidate list, including for example a 'SingleFight' test 532 and an 'Online1v1' test 534, each describing a test template specific character or game actions. In the illustrated example, the user has loaded four tests. The first test 532 is a 'local versus' fight test, which needs one console to execute. The second 534 is an online fight test, which needs two consoles. The third one 536 is a 'KlassicTower' test, which needs one console. The fourth 538 is a 'KryptInteraction' test, which also needs one console. Function buttons 560B at the bottom of the middle panel 530 initiate the creation, loading, or execution of selected tests when selected by the user. Other buttons allow for selection of loaded tests or editing of configuration data for selected tests.

In response to user selection of the 'execute' button of the function buttons 560B, the test manager promotes the selected tests to the right-most panel 550, showing a test execution list. The execution list shows which tests are running (or completed) on which consoles for which application-under-test, and the current status (e.g., in progress, passed, failed) of each test. In the illustrated example, the upper two test items 552, 554 indicate a 'passed' status' while the lower two items 556 and 558 indicate a 'failed' status. Function buttons 560C enable the end user to abort a selected test or obtain a report for a completed test.

Figure 6:
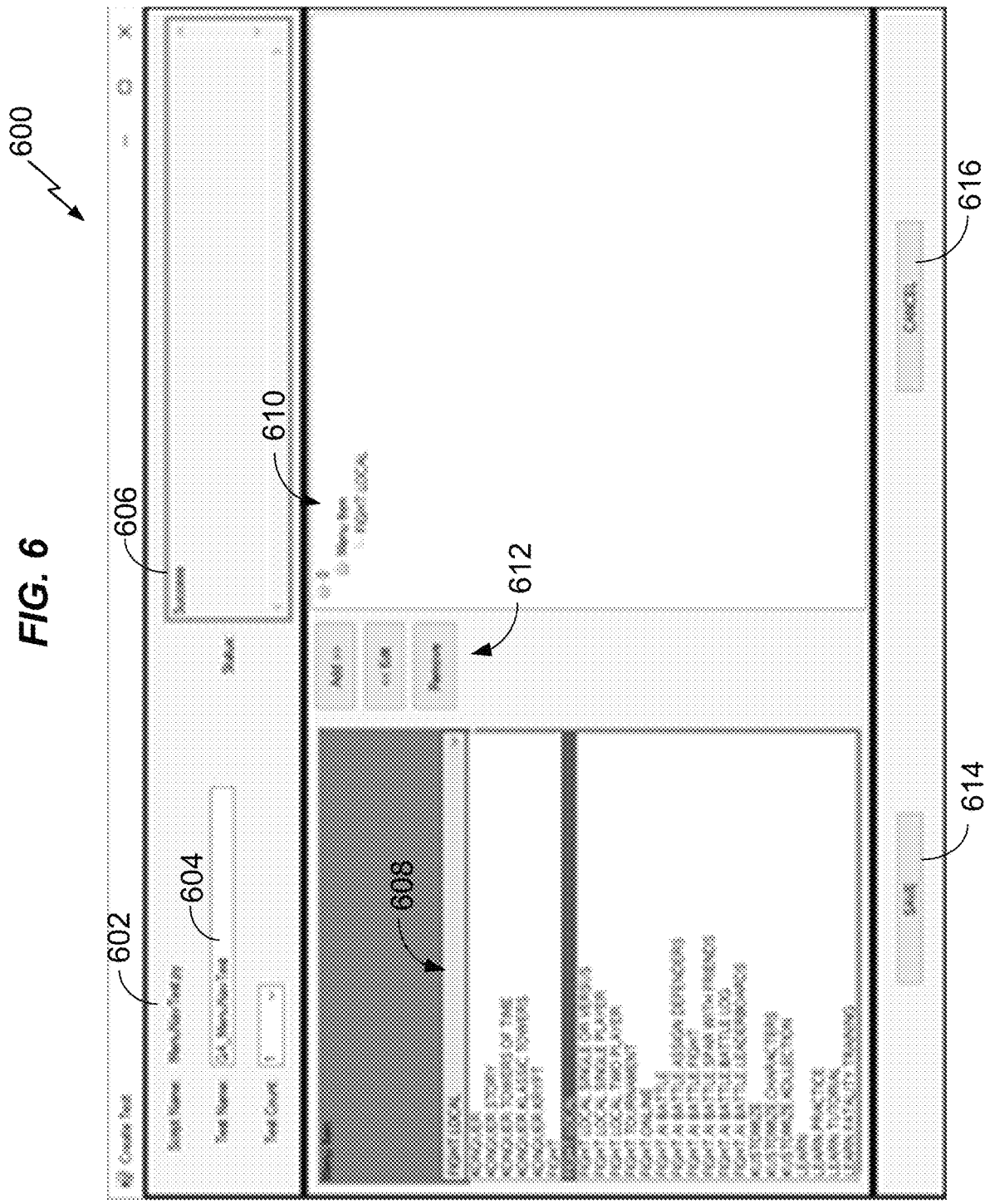
FIG. 6 is a screenshot illustrating aspects of a GUI of a test manager application for performing other operations of a method as described herein.

FIG. 6 shows a screenshot 600 of a test manager GUI for creating (e.g., defining) a test by enabling a QA end user to pick and configure test templates. The end user creates a test by choosing a test template script file, named at 602. The test manager 108 invokes a function (e.g., "getTestDataDef( )") from the chosen script to generate the configuration data selection UI. For instance, if a QA person wants to create a menu navigation test 604, she selects the menu navigation test template script which provides the option to pick a menu item from a list of available options. After selecting the configuration data, the test manager saves the test as a JSON file which contains the user selected configuration data along with reference to the test template script file.

The GUI enables end users to modify the test file by updating the configuration data or editing the test count. It also enables users to create a new test based on an existing test, by editing an existing test and saving it under a new name, using the edit buttons 610 and save button 614. To cancel edits, a user may select the cancel button 616. Status of an edit or save operation may be shown in a status box 606. The left panel 608 provides a list of test templates that may be included in the test file. The user may highlight desired templates (e.g., "FIGHT_LOCAL") and add or remove from the test in a desired order using the edit buttons 612. The right panel 610 shows a summary of the content and arrangement of test templates in an existing test.

After a test is defined, an end user may load the test into the test manager by selecting a test (JSON) file. The test manager provides the user with an option to edit or execute the test once loaded. To execute a loaded test, the user uses the test manager application to select the platform and devices to run the test. When executing a test, the test manager invokes a test template function (e.g., "executeTest( )") by passing it arguments (including configuration data), for example as a JSON object.

The test manager may also display an output log of events occurring in the game while executing a test. Once test execution is complete, the game component passes test result data, for storage or display by the test manager. The test manager may also provide an option to fetch crash dumps from the test device, if a crash occurred during the test.

Figure 7:
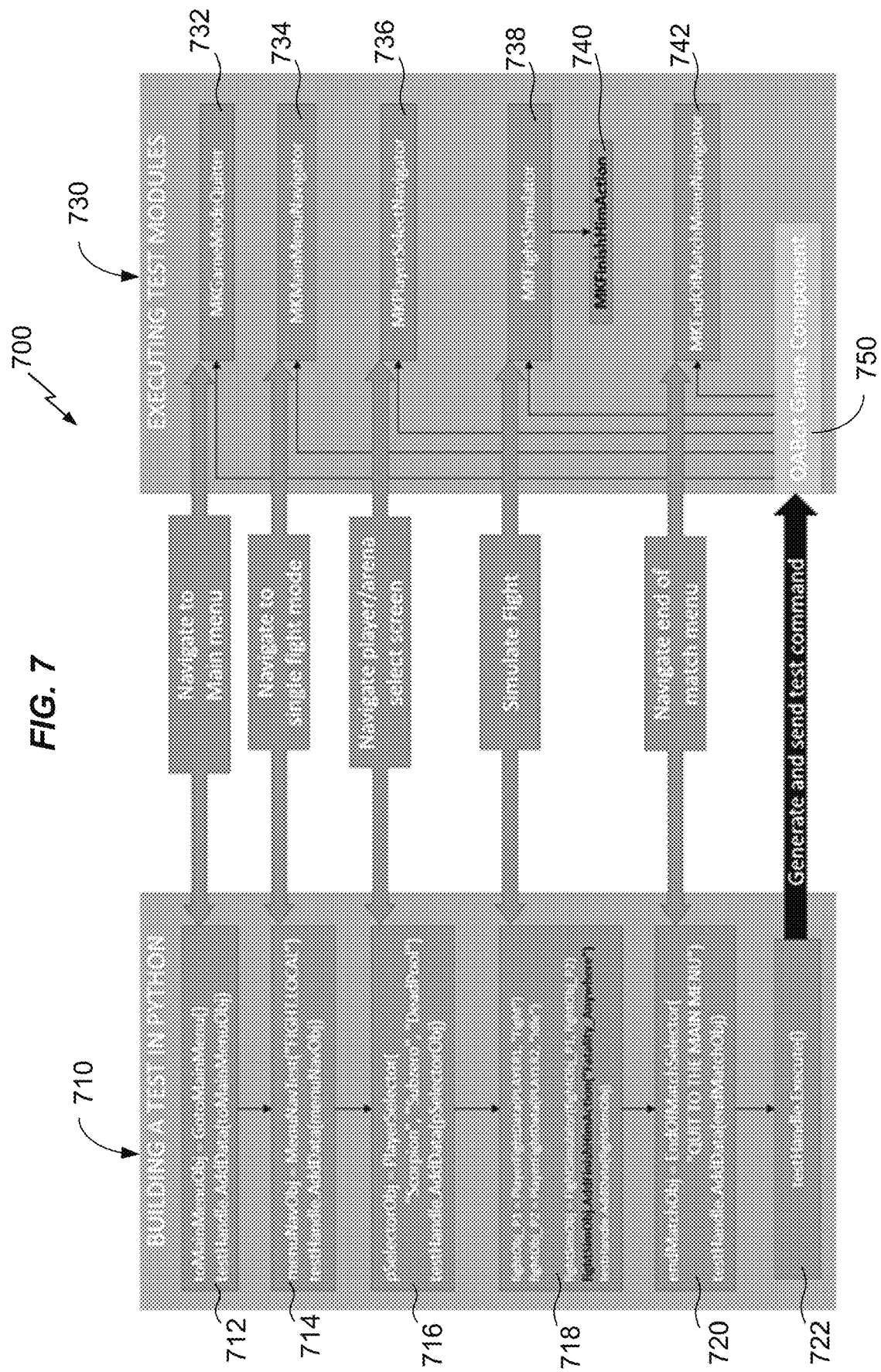
FIG. 7 is a block diagram showing illustrative examples of script file components in connection with executable modules of a test manager application.

FIG. 7 shows a more detailed example of a modular architecture for a test 700, with examples of script file components 710 in connection with actions executing in a game under test 730 via a QABot game component 750 (also called a QABot agent). To execute a test, the test template scripts 712-722 generate and send test commands from a test module to the QABot game component 750, which causes the game under test to execute the action commanded by each module. The example shown in FIG. 7 illustrates sequencing test modules 710 to perform a single fight test.

The modular architecture enables end users to have control over constructing test sequences, without needing to write code. In the illustrated sequence 700, an initial script 712 causes the QABot 750 to issue a mode quitter command 732 causing the game application 730 to navigate to the main menu. To initiate the fight, the next script 714 triggers navigation to a single fight menu at 734. The next script 716 causes the QABot agent 750 to issue a command selecting the players for the fight. A QA end user can control the outcome of the fight by nesting script templates. For example, to the end the fight with a fatality, the user may add the "Fatality_Anywhere" action to the "FightSimulator" module 718, which in turn will invoke the "MKFinishHimAction" command 740 within the game 730. Finally, a termination script 720 causes the QABot agent 750 to invoke a command 742 calling the end of match menu. The execute script 722 initiates generation and sending of the test command to the QABot 750, causing the QABot to issue the commands 732-742 in the same order as the script components 712-720 in the test file.

Figure 8:
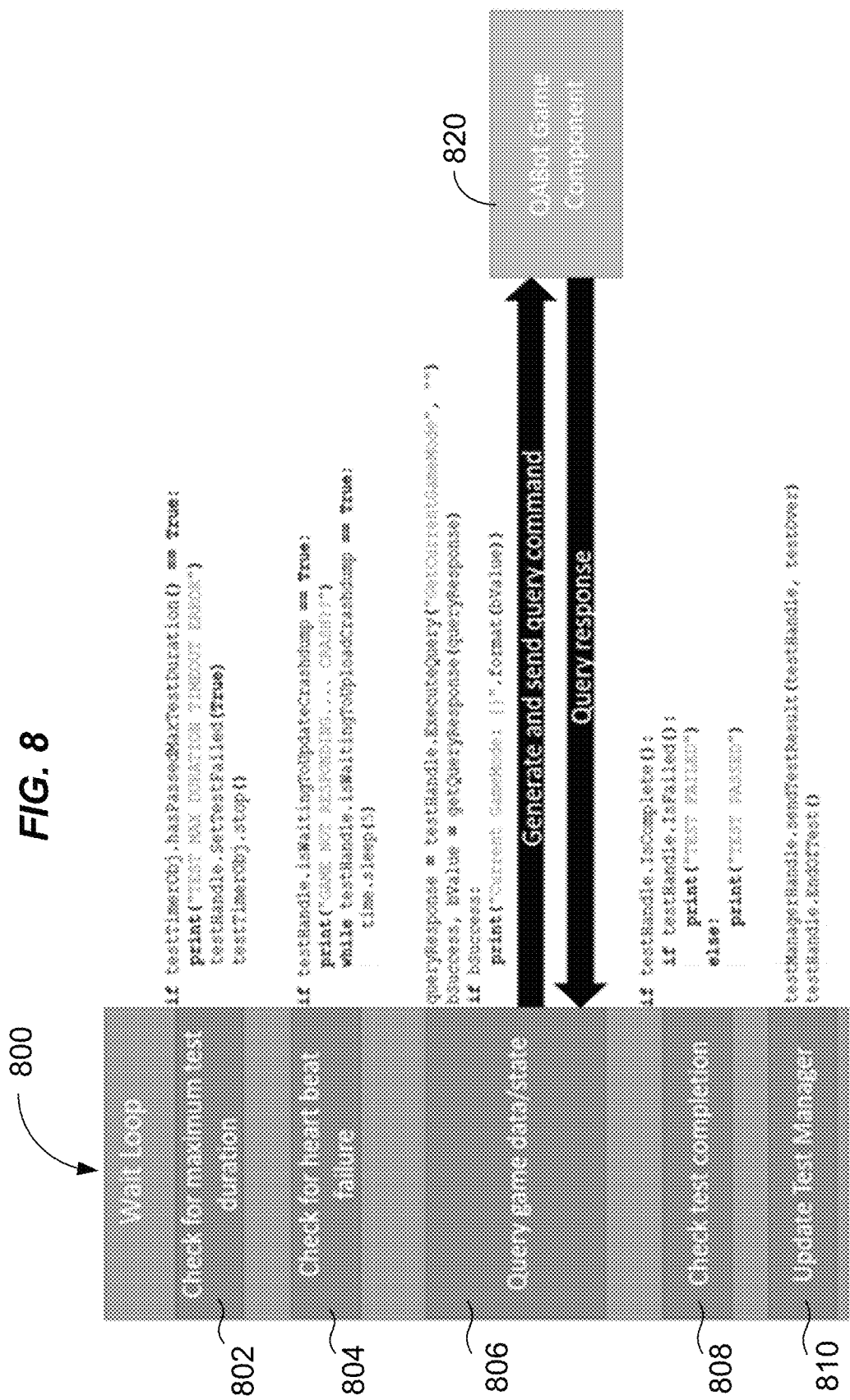
FIG. 8 is a composite chart showing an example of a wait loop defined by a test in connection with Python code examples.

After sending the test command for execution, the test template script enters a wait loop until the test completes. FIG. 8 shows an example of a wait loop 800 defined by a test in connection with Python code examples. During the wait loop a time-out module 802 checks whether the test times out based on a maximum set duration, and a heartbeat module 804 checks the heartbeat signal between the test script and the game. A query game data/state module 806 generates and sends query commands to the QABot game component 820 and receives query responses. A completion module 808 checks whether the test completes successfully by executing all the actions specified in the test command or detects a failure while performing those actions. An update module 810 updates the test manager based on the test results.

Figure 9:
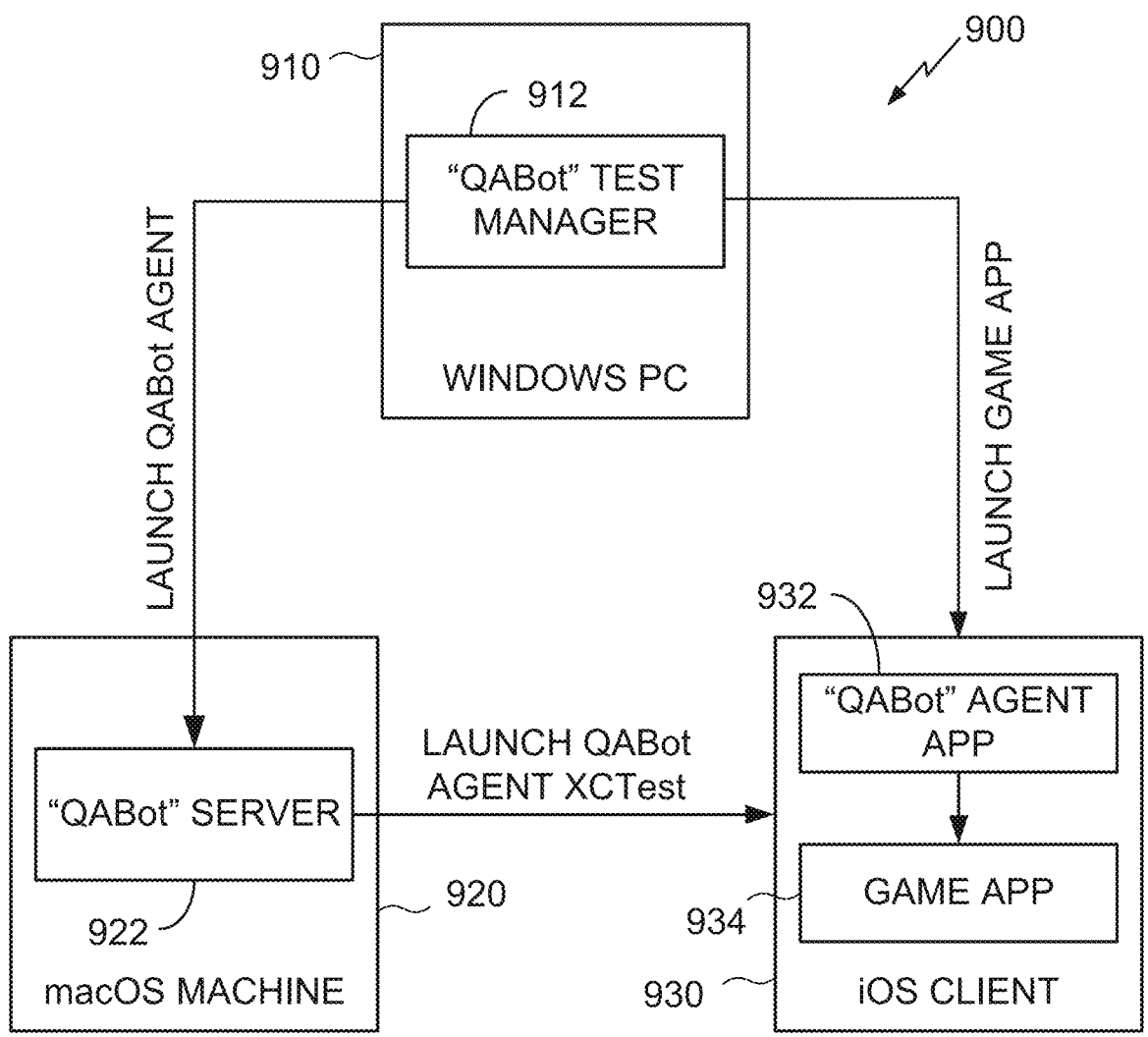
FIG. 9 is a block diagram illustrating components of a system for automated software testing using an interposed server intermediary.

In some embodiments, tools used by the test manager to communicate with game components operating on the test device may not operate due to incompatibilities between operating systems. For example, in the described embodiment, the Windows™-based architecture for the test manager application broke the ability of the test manager to communicate and control execution of test modules in iOS test device. To overcome this obstacle, an intermediate server may be introduced. FIG. 9 illustrates components of a system 900 for automated software testing using an intermediate server 922 interposed between the test client 930 operating the QABOT agent application 932 and the QABot test manager 912 operating on a Windows™ personal computer. The Test manager could communicate with Android™ or Windows™ devices, but not iOS™ devices.

For QABot to be available for both console & mobile development, an interface to support iOS devices for installing, launching and killing game applications under test may be needed. No Windows-based libraries exist to achieve a seamless interface. A custom QABotAgent iOS application 922 operating on a macOS machine 920 may be effective. The iOS application 922 may include support for XCTest framework, so that the application can be launched via command-line from a connected macOS machine 922. In addition, the agent application 932 may include support for a TCP channel to enable communication with an external system, and an ability to launch any application if given a URL command.

The QABotServer 922 macOS application runs on a macOS machine, with a TCP channel to take in commands from external system (QABot Test Manager 912) and process it in parallel. The server 922 may include an ability to launch the QABotAgent iOS application 932 with the game under test 934 on a specified device 930 as an XCTest, via command-line. The server 922 may further include a function for fetching data (e.g., device logs or screenshots) from any specified device.

When a user running the QABot test manager 912 issues a command to launch the game app on an iOS device 930, the system 900 performs the following operations. The test manager 912 instructs the QABotServer 922 to launch the QABotAgent application 932 on a selected iOS test device. The QABotServer 922 then launches the QABotAgent application 932 using XCTest commands, which brings QABotAgent application 932 to the foreground of the test device 930. The test manager 912 then instructs the QABotAgent application 932 to launch the game application under test 934 by supplying a URL command. In response, the QABotAgent 932 executes the URL command to launch the game application 934 including test modules. Once the QABotServer 922 is configured, QA end users may use the system 900 to seamlessly interact with iOS test devices with iOS and test devices with other Windows-compatible operating systems.

Figure 10:
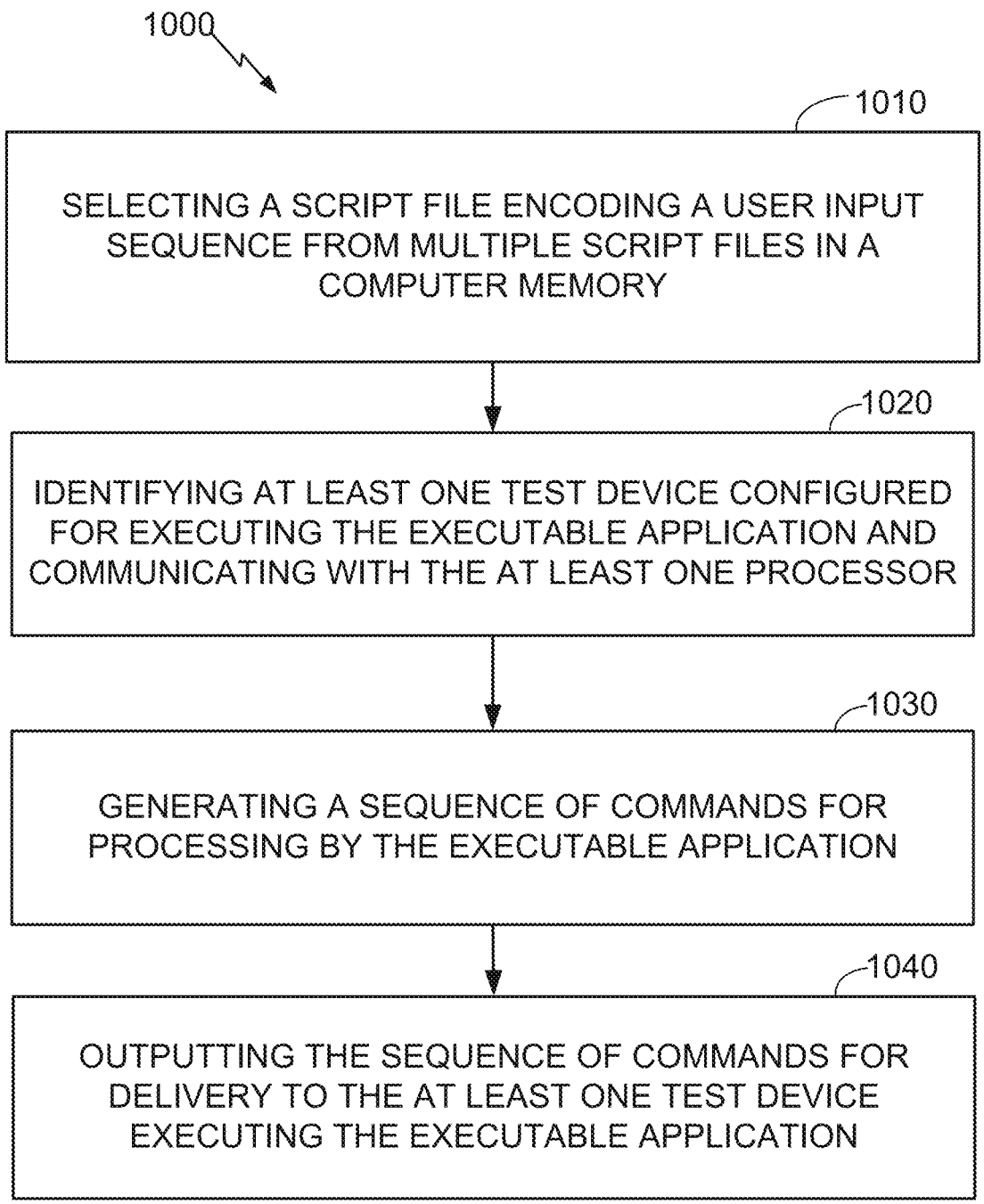
FIG. 10 is a flow chart illustrating aspects of a method for automated software testing.

In accordance with the foregoing, and by way of additional example, FIG. 10 shows more general aspects of a method 1000 according to an embodiment, as may be performed by a QA terminal as described herein. It should be appreciated that the more general operations of the method 1000 may include or embody more detailed aspects of corresponding methods described herein above.

Referring to FIG. 10, a computer-implemented method 1000 for automatically testing reaction of an executable application to user inputs may include, at 1010, selecting, by at least one processor in response to first user input, a script file encoding a user input sequence from multiple script files in a computer memory. Each of the script files may be prepared in advance by technical staff and may include information for controlling a specified test operation by an application-under-test, e.g., a videogame. FIG. 3 shows an example of code and a user interface for selecting a script file for including in a test.

The method 1000 may further include, at 1020, identifying, by the at least one processor, at least one test device configured for executing the executable application and communicating with the at least one processor. The test device may include any computing device capable of executing the application-under-test. FIG. 5 shows an example of a console list 510 maintained by a test manager application, identifying several test devices. In addition to identifying the test devices, the test manager may determine a current status for each test device, for example using a heartbeat, periodic status check, or event-based status checking.

The method 1000 may further include, at 1030, generating, by the at least one processor based on the script file, a sequence of commands for processing by the executable application. For example, the at least one processor may execute an algorithm that automatically generates commands for a test module of the application-under-test, based on contents of the script file. As described herein above, a test manager component may transcode game actions defined by scripted variables into commands for processing by a test module of the application under test.

The method 1000 may further include, at 1040, outputting the sequence of commands for delivery to the at least one test device executing the executable application-under-test. The outputting may include, for example, opening a TCP session with the test device.

The method 1000 may include any one or more additional operations 1100, 1200 or 1300 as described herein. Each of these additional operations is not necessarily performed in every embodiment of the method, and the presence of any one of the operations does not necessarily require that any other of these additional operations also be performed.

For example, referring to FIG. 11, in some embodiments the method 1000 may include, at 1110, instructing a server interposed between the at least one test device and the at least one processor to launch an agent application on the at least one test device. The method may further include, at 1120, establishing a connection between the at least one processor and the agent application operating on the at least one test device for outputting the sequence of commands. For example, using the interposed server may be useful when the at least one processor lacks access to an application program interface (API) or similar tool for providing executable commands to the test device. Further description is provided herein above in connection with FIG. 9.

For further example, referring to FIG. 12, in some embodiments selecting in the method 1000 may include, at 1210, presenting a list of the multiple script files in a user interface and receiving a user selection from the list indicating the script file. In an alternative, or in addition, the selecting in the method 1000 may include, at 1220, presenting a list of test devices satisfying one or more criteria in a user interface and receiving a user selection from the list indicating the at least one test device.

FIG. 13 illustrates further operations 1300 that may also be included in the method 1000. At 1310, the method 1000 may include receiving an indication from the at least one test device indicating a status of the executable application after executing the sequence of commands and outputting the indication. The indication may be configured for use by QA personnel to identify issues with the application-under-test on the test device.

At 1320, the method 1000 may include communicating with a communication layer of a test module of the executable application and a game layer of the test module. In an aspect of the method, the executable application (application-under-test) may include a test module comprising a communication layer that handles communication with the at least one processor, and the game layer that processes the sequence of commands. The test module may be deactivated in published versions of the executable application or omitted entirely.

The communication layer may, for example, listen for incoming TCP connection requests generated by the at least one processor. Accordingly, the method 100 may further include, at 1330, initiating the communication by sending a TCP layer connection request to the communication layer.

At 1340, the method 1000 may include generating the sequence of commands at least in part by transcoding the user input sequence from a scripting language to a command language. Any suitable transcoding method may be used, for example, parsing a test file including script and configuration data, determining a sequence of actions based on the parsing, and querying a database for commands corresponding to identifiers of actions in the sequence.

In an aspect, the method 1000 may further include, by the at least one processor, performing multiple instances of the method in parallel, wherein each instance is for a different test device. Accordingly, the at least one processor can test the suitability of many different test devices at once and identify any issues that the application-under-test may have with operating on different hardware models and operating system versions.

Figure 14:
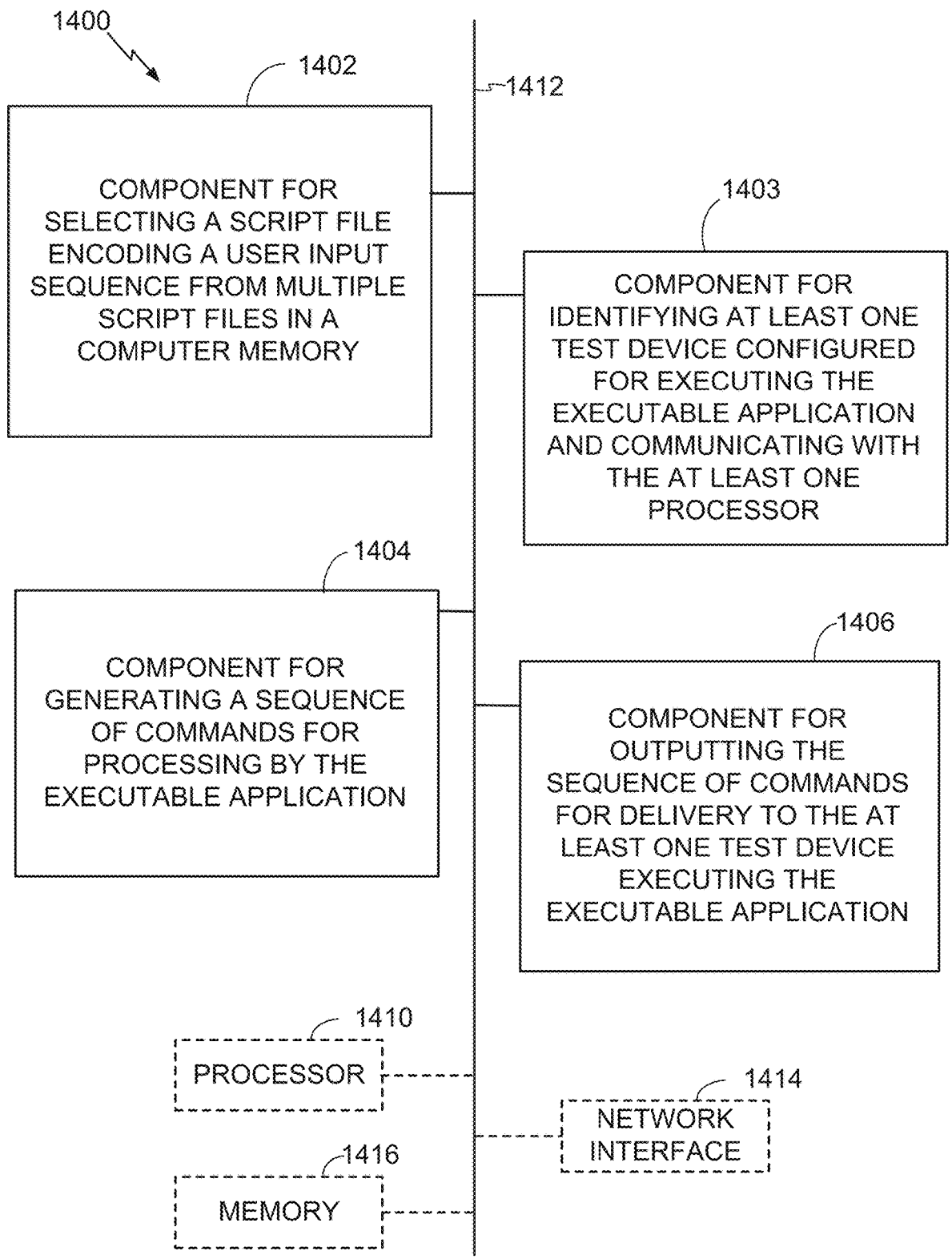
FIG. 14 is a block diagram illustrating aspects of an apparatus for automated software testing.

FIG. 14 is a conceptual block diagram illustrating components of an apparatus or system 1400 for automatically testing reaction of an executable application to user inputs as described herein, according to one embodiment. As depicted, the apparatus or system 1400 may include functional blocks that can represent functions implemented by a processor, software, or combination thereof (e.g., firmware).

The computing apparatus 1400 may further include a random-access memory (RAM) 1416 holding program instructions and data for rapid execution or processing by the processor during operation. When the apparatus 1400 is powered off or in an inactive state, program instructions and data may be stored in a long-term memory, for example, a non-volatile magnetic, optical, or electronic memory storage device (not shown). Either or both RAM 1416 or the storage device (if present) may comprise a non-transitory computer-readable medium holding program instructions, that when executed by the processor 1410, cause the apparatus 1400 to perform a method or operations as described herein.

Program instructions may be written in any suitable high-level language, for example, C, C++, C #, or Java™, and compiled to produce machine-language code for execution by the processor. Program instructions may be grouped into functional modules, to facilitate coding efficiency and comprehensibility. It should be appreciated that such modules, even if discernable as divisions or grouping in source code, are not necessarily distinguishable as separate code blocks in machine-level coding. Code bundles directed toward a specific function may be considered to comprise a module, regardless of whether machine code on the bundle can be executed independently of other machine code. In other words, the modules may be high-level modules only.

As illustrated in FIG. 14, the apparatus or system 1400 may comprise an electrical component 1402 for selecting a script file encoding a user input sequence from multiple script files in a computer memory. The component 1402 may be, or may include, a means for said selecting. Said means may include the processor 1410 coupled to the memory 1416, and to the network interface 1414, the processor executing an algorithm based on program instructions stored in the memory. Such algorithm may include a sequence of more detailed operations, for example, the operations 1200 as described in connection with FIG. 12.

The apparatus or system 1400 may further comprise an electrical component 1403 for identifying at least one test device configured for executing the executable application and communicating with the at least one processor. The component 1403 may be, or may include, a means for said identifying. Said means may include the processor 1410 coupled to the memory 1416, the processor executing an algorithm based on program instructions stored in the memory. Such algorithm may include a sequence of more detailed operations, for example, broadcasting a query to a list of devices, and checking an identifier for each different response to the query.

The apparatus or system 1400 may further comprise an electrical component 1404 for generating a sequence of commands for processing by the executable application. The component 1404 may be, or may include, a means for said generating. Said means may include the processor 1410 coupled to the memory 1416, the processor executing an algorithm based on program instructions stored in the memory. Such algorithm may include a sequence of more detailed operations, for example, transcoding the user input sequence from a scripting language to a command language. An example of such transcoding is described in connection with FIGS. 3, 7 and elsewhere herein.

The apparatus or system 1400 may further comprise an electrical component 1406 for outputting the sequence of commands for delivery to the at least one test device executing the executable application. The component 1406 may be, or may include, a means for said outputting. Said means may include the processor 1410 coupled to the memory 1416, and to the network interface 1414, the processor executing an algorithm based on program instructions stored in the memory. Such algorithm may include a sequence of more detailed operations, for example, reading data to be output from a computer memory, packaging the data according to a protocol used by the network interface (e.g., TCP/IP), and providing the packaged data to a transport layer for sending via the network interface.

The apparatus 1400 may optionally include a processor module 1410 having at least one processor, in the case of the apparatus 1400 configured as a data processor. The processor 1410, in such case, may be in operative communication with the modules 1402-1406 via a bus 1412 or other communication coupling, for example, a network. The processor 1410 may effect initiation and scheduling of the processes or functions performed by electrical components 1402-1406.

In related aspects, the apparatus 1400 may include a network interface module 1414 operable for communicating with test devices over a computer network. In further related aspects, the apparatus 1400 may optionally include a module for storing information, such as, for example, a memory device/module 1416. The computer readable medium or the memory module 1416 may be operatively coupled to the other components of the apparatus 1400 via the bus 1412 or the like. The memory module 1416 may be adapted to store computer readable instructions and data for effecting the processes and behavior of the modules 1402-1406, and subcomponents thereof, or the processor 1410, or the method 1000 and one or more of the additional operations 1100, 1200 or 1300 described in connection with the method 1000. The memory module 1416 may retain instructions for executing functions associated with the modules 1402-1406. While shown as being external to the memory 1416, it is to be understood that the modules 1402-1406 can exist within the memory 1416.

Further aspects of the disclosure are provided in the following Appendix.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer or system of cooperating computers. By way of illustration, both an application running on a server and the server can be a component. One or more components may reside within a process and/or thread of execution and a component may be localized on one computer and/or distributed between two or more computers.

Various aspects will be presented in terms of systems that may include several components, modules, and the like. It is to be understood and appreciated that the various systems may include additional components, modules, etc. and/or may not include all the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Operational aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Furthermore, the one or more versions may be implemented as a method, apparatus, or article of manufacture using standard programming and/or engineering techniques to produce software, firmware, hardware, or any combination thereof to control a computer to implement the disclosed aspects. Non-transitory computer readable media can include but are not limited to magnetic storage devices (e.g., hard disk, floppy disk, magnetic strips . . . ), optical disks (e.g., compact disk (CD), digital versatile disk (DVD), BluRay™ . . . ), smart cards, solid-state devices (SSDs), and flash memory devices (e.g., card, stick). Of course, those skilled in the art will recognize many modifications may be made to this configuration without departing from the scope of the disclosed aspects.

The previous description of the disclosed aspects is provided to enable any person skilled in the art to make or use the present disclosure. Various modifications to these aspects will be clear to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers.

The invention claimed is:

1. A computer-implemented method for automatically testing reaction of an executable application to user inputs, the method comprising:

selecting, by at least one processor of a computer executing a first operating system in response to first user input, a script file encoding a user input sequence from multiple script files in a computer memory;

identifying, by the at least one processor, at least one test device configured for executing the executable application and communicating with the at least one processor;

determining, by the at least one processor, whether the at least one test device is operating the first operating system, an operating system compatible with the first operating system, or a second operating system that is not compatible with the first operating system;

if the at least one test device is operating the second operating system, instructing a server interposed between the at least one test device and the at least one processor to launch an agent application on the at least one test device;

if the at least one test device is operating one of the first operating system or an operating system compatible with the first operating system, causing the at least one test device to launch the agent application without involvement of any intermediate server;

establishing a connection between the at least one processor and the agent application operating on the at least one test device for outputting the sequence of commands;

generating, by the at least one processor based on the script file, a sequence of commands for processing by the executable application; and outputting the sequence of commands for delivery to the at least one test device executing the executable application.

2. The method of claim 1, wherein the selecting further comprises presenting a list of the multiple script files in a user interface and receiving a user selection from the list indicating the script file.

3. The method of claim 1, wherein the selecting further comprises presenting a list of test devices satisfying one or more criteria in a user interface and receiving a user selection from the list indicating the at least one test device.

4. The method of claim 1, further comprising, by the at least one processor, performing multiple instances of the method in parallel.

5. The method of claim 1, further comprising receiving an indication from the at least one test device indicating a status of the executable application after executing the sequence of commands, and outputting the indication.

6. The method of claim 1, wherein the executable application includes a test module comprising a communication layer that handles communication with the at least one processor, and a game layer that processes the sequence of commands.

7. The method of claim 6, wherein the communication module of the executable application listens for incoming Transmission Control Protocol (TCP) connection requests generated by the at least one processor.

8. The method of claim 1, wherein the generating further comprises transcoding the user input sequence from a scripting language to a command language.

9. The method of claim 8, wherein the scripting language comprises Python and the command language comprises a JavaScript Object Notation Remote Procedure Call (JSON-RPC).

10. The method of claim 1, wherein the outputting further comprises opening a Transmission Control Protocol (TCP) session with the test device.

11. An apparatus for automatically testing reaction of an executable application to user inputs, comprising at least one processor operatively coupled to a computer memory, the memory holding instructions that when executed by the processor, cause the apparatus to perform:
  selecting a script file encoding a user input sequence from multiple script files in a computer memory;
  identifying at least one test device configured for executing the executable application and communicating with the at least one processor;
  determining whether the at least one test device is operating the first operating system, an operating system compatible with the first operating system, or a second operating system that is not compatible with the first operating system;
  if the at least one test device is operating the second operating system, instructing a server interposed between the at least one test device and the at least one processor to launch an agent application on the at least one test device;
  if the at least one test device is operating one of the first operating system or an operating system compatible with the first operating system, causing the at least one test device to launch the agent application without involvement of any intermediate server;
  establishing a connection between the at least one processor and the agent application operating on the at least one test device for outputting the sequence of commands;
  generating a sequence of commands for processing by the executable application; and
  outputting the sequence of commands for delivery to the at least one test device executing the executable application.

12. The apparatus of claim 11, wherein the memory holds further instructions for communicating with a communication layer of a test module of the executable application, wherein the communication layer handles communication and a game layer of the test module processes the sequence of commands.

13. The apparatus of claim 11, wherein the memory holds further instructions for the generating at least in part by transcoding the user input sequence from a scripting language to a command language.

14. A system for automatically testing a video game by simulating various inputs provided by a user during game play, the system comprising:
  an electronic testing device under the control of a first operating system, wherein the electronic testing device communicates with one or more electronic game play devices under control of one of the first operating system or an operating system compatible with the first operating system, without involvement of any intermediate server;
  a second electronic game play device under the control of a second operating system not compatible with the first operating system; and
  an electronic bridge device comprising a server interposed between the electronic testing device and the second electronic game play device configured to receive instructions from the electronic testing device, launch an automated test application on the second electronic game play device, wherein the electronic testing device is configured to launch the automated test application upon determining that the second electronic game play device is operating the second operating system that is not compatible with the first operating system.

15. The system of claim 14, wherein the electronic testing device instructs the electronic bridge device to launch the automated test application on the second electronic game play device.

16. The system of claim 15, wherein the electronic bridge device establishes a connection between the electronic testing device and the automated test application operating on the electronic game play device for outputting a sequence of commands from the electronic testing device to the second electronic game play device.

17. The system of claim 16, wherein the electronic testing device generates the sequence of commands for delivery to the automated test application operating on the second electronic game play device.

* * * * *